Patented Aug. 20, 1940

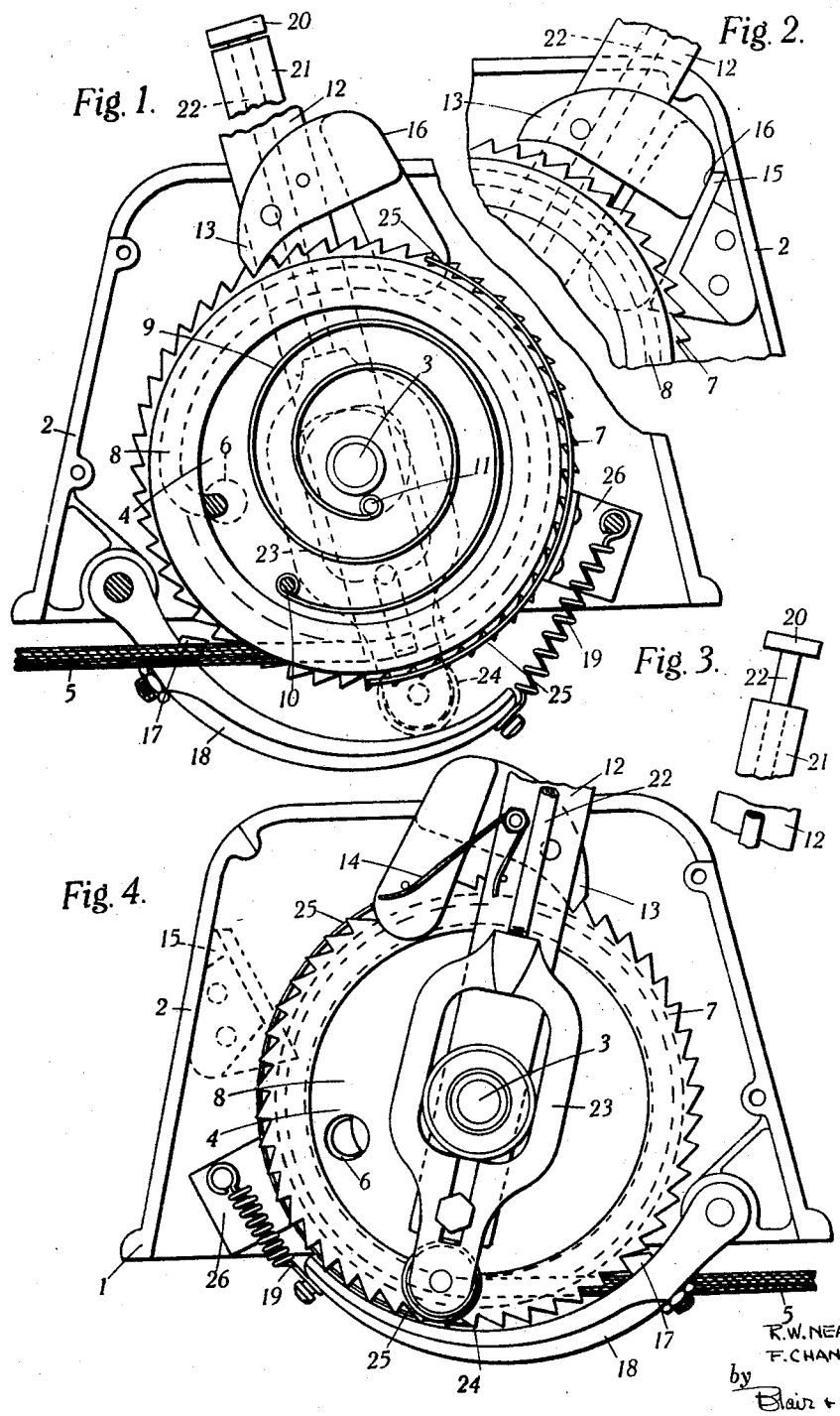

2,212,165

UNITED STATES PATENT OFFICE 2,212,165

BRAKE CONTROL MECHANISM

Reginald William Neate, Kingston-on-Thames, and Frederick Chandler, Norbiton, England; said Chandler assignor to said Neate Application July 24, 1939, Serial No. 286,248
In Great Britain December 7, 1938

9 Claims. (Cl. 74—152)

This invention relates to improvements in or relating to brake control mechanism particularly of the kind including the use of a cable which is wound upon a drum during brake-applying movements and unwound therefrom during brake-releasing movements. In brake mechanism of this kind it has been proposed to use a ratchet lever for actuating the drum in a brake-applying direction and an independent pawl has been provided for preventing unintentional unwinding of the drum, the release of this pawl has however merely effected the complete release of the brakes, the partial or gradual release being impossible, and moreover such complete release has in some cases involved a separate and distinct action on the part of the operator, for example the operation of a foot pedal, which is in itself objectionable for instance in cases where the brake has to be operated by the driver of a road vehicle.

One of the objects of the present invention is to provide improved brake control mechanism involving the use of a drum around which a brake-actuating cable is adapted to be wound wherein the application of the brakes as well as the partial, gradual or complete and substantially instantaneous release thereof can be controlled by manipulation of a single control member.

Another object of the present invention is to provide improved brake control mechanism involving the use of a drum around which a brake-actuating cable is adapted to be wound wherein angularly movable means adapted to make uni-directional engagement either directly or indirectly with said drum are provided for rotating said drum to any desired extent in a brake-applying direction and means are also provided for normally preventing reverse rotation of said drum, said latter means being adapted to be released when desired by operation of a control element carried by said angularly movable means.

With the above and other objects in view the present invention resides in the features hereinafter set forth and claimed in the appended claims.

In carrying out the present invention the means employed for making uni-directional engagement with the aforesaid drum may comprise angularly movable means and associated pawl and ratchet mechanism and in such cases provision is preferably made whereby said pawl may be urged into a position of disengagement when said angularly movable means are moved to their limit position in a brake-releasing direction so providing for the complete disconnection of said drum from its actuating means when desired.

The aforesaid drum is preferably provided with a groove adapted to receive the cable to be wound thereon and in order to keep the cable within this groove and to keep it from becoming entangled with the control mechanism we preferably provide one or more leaf springs or the like which advantageously follow the contour of the drum and have their surfaces close to the periphery of the flanges defining said groove.

The aforesaid drum may, if desired, be mounted for free rotatition in both directions but we preferably subject such drum to the influence of one or more springs. Thus, for instance, such drum may be freely mounted on a shaft and be coupled thereto by a coil spring, preferably one of rectangular cross-section, one end of said spring being anchored to the shaft or other relatively fixed part of the device, and the other being anchored to the drum or adapted to co-operate with a projection or the like provided thereon. By adopting the former mode of mounting the drum may be wound up against the action of the spring, i. e. the spring becomes tensioned during brake-applying movements and ensures that the drum will return to the desired normal position as soon as the brakes are freed, whereas by adopting the latter method the drum may be moved in a brake-applying direction without deforming the spring and upon reverse movement of the drum the spring acts as a resilient stop locating the drum in the desired normal position.

The above mentioned angularly movable means may advantageously consist of a hand lever which may, if desired, be pivoted about the shaft for the above mentioned drum and the control for the aforesaid means for normally preventing reverse movement of the drum may, for instance, include a cap or button located at the head of the lever, such cap or button being normally urged outwardly, by one or more springs, into the position for preventing reverse movement of the drum and being adapted to be pressed inwardly by the operator into the position in which the drum is freed for such movement.

In order that the present invention may be well understood we will now describe by way of example one embodiment of such invention in application to a control for trailer brakes and with reference to the accompanying drawing, in which Figure 1 is a view in side elevation of brake control mechanism according to the invention, half of the casing having been removed to show the internal parts of the mechanism, Figure 2 is a fragmentary view in side elevation showing part of the mechanism in the position it occupies when the brakes are being released suddenly, Figure 3 is a fragmentary view in side elevation of the hand lever with the button in its released position and, Figure 4 is a view in side elevation showing the mechanism as seen on the reverse side with respect to Figure 1, the other half of the casing having been removed.

The brake mechanism shown in the drawing includes a casing consisting of two separable halves, each of which has a base flange 1 and an upstanding part 2. A main spindle 3 passes through the casing and a drum 4 is mounted thereon.

The drum 4 includes a groove formed in an enlarged rim portion and adapted to receive the brake control cable 5, one end of the said cable being anchored to the drum 4, for instance, by passing said end through a hole 6 (Figure 1) into the said groove and providing an enlarged head on the extreme end of the cable, said head being received in the dished side portion of the drum 4.

Ratchet teeth 7 are provided on one of the flanges 8 defining a side of the aforesaid groove, said flange 8 being suitably enlarged for the purpose. However, if desired, the ratchet teeth 7 may, instead, be provided on the drum 4 or on a disc rigidly attached thereto.

A coil spring 9 (Figure 1), which may, for instance, be of rectangular cross-section, is provided for coupling the drum 4 to the casing, one end of the spring 9 being anchored to the casing by means of a pin 10 and the other end of the spring 9 being anchored to the drum 4 by means of a pin 11. If desired, instead of being coupled to the casing, the drum 4 may be coupled, by means of the spring 9, to the main spindle 3 or to some other fixed part of the device.

A hand-control lever 12 is pivoted about the main spindle 3 and extends through a slot in the top of the casing. The lever 12 carries a pawl 13 which is actuated by a leaf spring 14 (Figure 4) and engages the ratchet teeth 7 when the lever is moved in the brake-applying direction (the counter-clockwise direction according to Figure 1) but rides freely over them when it is moved in the brake-releasing direction (the clockwise direction according to Figure 1).

An abutment 15 (Figures 2 and 4) is provided in the casing in such a position that, when the control lever 12 is swung to the end of its movement in the brake-releasing direction, it contacts with the part 16 (Figure 2) of the pawl 13 and knocks it out of engagement with the ratchet teeth 7.

A locking pawl 17 (Figures 1 and 4) is provided on a pivoted arm 18 of arcuate form following the contour of the drum 4 and being spring urged into a position in which the pawl 17 engages the ratchet teeth 7. In the arrangement shown two parallel check springs 19, 19, are provided for urging the arm 18 into a position in which the pawl 17 engages with the drum 4, one of such springs being shown in an extended condition in Figure 3 and the other being shown in a normal condition in Figure 4.

A depressible button 20 is provided at the top of the control lever 12 and depression of this button is adapted to cause the pivoted arm 18 to swing away from the drum 4 and thus to move the pawl 17 out of engagement with the ratchet teeth 7. The handle 21 (Figures 1 and 3) of the control lever 12 is offset slightly to the side and the button 20 is mounted on a rod 22 extending through the handle 21 to a yoke 23 (Figures 1 and 4) which embraces the main spindle 3 and can be caused to slide diametrically with respect thereto. A roller 24 (Figures 1 and 4) is mounted on the lower part of the yoke 23 and contacts with the arcuate arm 18 in such a manner that, when the button 20 is depressed, the pawl 17 is freed, the pawl 17 being returned to its locking position by the pressure of the springs 19, 19, on the arm 18 as soon as the button 20 is released.

In order to prevent the cable 6 from leaving the groove in the drum 4 particularly in the event of any over-running of the drum at the end of its movement in a brake releasing direction a leaf spring 25 closely follows part of the periphery of the groove in which the cable rests, said leaf spring being mounted, for instance, on a bracket 26 to which may also be anchored the earlier mentioned springs 19.

The operation of the above described embodiment of our invention is as follows:

When it is desired to apply the brakes, the control lever 12 is oscillated the desired number of times for applying the brake to the desired extent, the drum 4 being prevented from any return movement by the pawl 17. If it is then desired to release the brakes, the first operation is to depress the button 20 and, in order to facilitate this step, it is desirable to press the control lever 12 in the brake-applying direction, thus relieving the pawl 17 of any pressure. If it is desired to release the brakes gradually or partially, the control lever 12 is allowed to move, and with it the cable drum 4, in the brake-releasing direction until the desired position has been reached, whereupon the button 20 is released and the drum 4 is locked in its new position, this operation being repeated one or more times if desired. If, on the other hand, it is desired to effect complete and sudden release of the brakes, then, after depressing the button 20, the control lever 12 is swung rapidly to the end of its movement in the brake-releasing direction, whereupon the abutment 15 knocks the pawl 13 out of engagement with the ratchet teeth 7 and permits the drum 4 to unwind under the pressure of the brake mechanism until it attains the normal released position as defined by the coil spring 9.

Whilst we have hereinbefore described one embodiment of our invention it is to be understood that the particular details may be varied or modified without departing from the scope thereof. Thus, for example, different means such, for instance, as cam mechanism or toggle or other lever mechanism may be employed for actuating the locking pawl 17 and any desired intermediate mechanism such, for instance, as gearing may be provided between the hand control lever 12 and the cable drum 4. Moreover, the locking pawl 17, instead of being provided at the bottom of the drum 4 may be located in any desired position around the periphery of said drum.

The use of brake control mechanism according to the present invention is not restricted to trailers; it may for instance also be used on lorries, for example on six-wheel lorries.

We claim:

1. Control mechanism for cable-actuated brakes of the kind comprising a rotatable ratchet drum, an angularly movable operating lever mounted on the axis of said drum having means effecting uni-directional operation of said ratchet drum, a locking pawl serving normally to prevent unwinding of said drum but adapted to be freed when desired, said locking pawl being carried on a pivotally mounted arcuate arm following the periphery of said drum, a subsidiary control slidably mounted on said operating lever and including a part extending beyond the axis of said control lever, the end of said extending part moving throughout the whole range of movement of said operating lever in a path substantially parallel with said arcuate arm when said subsidiary control is released but adapted to be projected radially outwardly thereby to swing said arcuate arm outwardly and move the locking pawl into its disengaged position when said subsidiary control is actuated.

2. In a mechanism as set forth in claim 1, in which the operating lever is provided at its outer end with an actuating button and at its inner end with a part adapted to sweep over said arcuate arm and urge the latter outwardly into pawl disengaging position when said button is depressed.

3. In a mechanism as set forth in claim 1, in which said operating lever is provided with an actuating button at one end and a roller at its other end, said roller being adapted to pass over said arcuate arm when said button is in its outermost position without imparting any movement to said arm but to urge said arm outwardly to free said locking pawl when said actuating button is depressed.

4. In a mechanism as set forth in claim 1, in which a coil spring is associated with the drum and has one end anchored thereto and the other to a fixed anchorage whereby resilient abutment is provided for opposing any over-running of the drum during brake releasing operations.

5. In a mechanism as set forth in claim 1, in which a leaf spring closely follows a part of the periphery of said drum for preventing the cable from slipping therefrom.

6. In a mechanism as set forth in claim 1, in which a leaf spring follows the periphery of said drum to prevent said cable from slipping therefrom, and in which a coil spring is anchored at one end to said drum and to a fixed anchorage at its other, thereby to provide a resilient abutment to oppose any over-running of the drum during brake releasing operations.

7. In a mechanism as set forth in claim 1, including means whereby said uni-directional operation between the lever and ratchet is positively released upon said operating lever being urged to its limit position in a brake releasing direction.

8. In a mechanism as set forth in claim 1, in which a roller is positioned at the end of said operating lever adapted to pass over said arcuate arm when said subsidiary control is in its outermost position without imparting any movement to said arm, and in which means are provided for disengaging the operating lever from said ratchet drum at the extreme limit of its movement in a brake releasing direction.

9. In a mechanism as set forth in claim 1, in which a leaf spring is associated with the periphery of the drum adapted to prevent the cable slipping therefrom, and in which a roller is mounted on the inner end of the lever adapted to move said arcuate arm outwardly in a pawl disengaging direction when said subsidiary control is actuated, and in which a stop is provided adapted to release the means connecting the lever with the ratchet at the extreme end of movement of the lever in a brake releasing direction.

REGINALD WILLIAM NEATE.
FREDERICK CHANDLER.